July 23, 1963  R. G. LYALL  3,098,580
QUICK OPENING CLOSURE MECHANISM
Filed Feb. 21, 1961  3 Sheets-Sheet 3
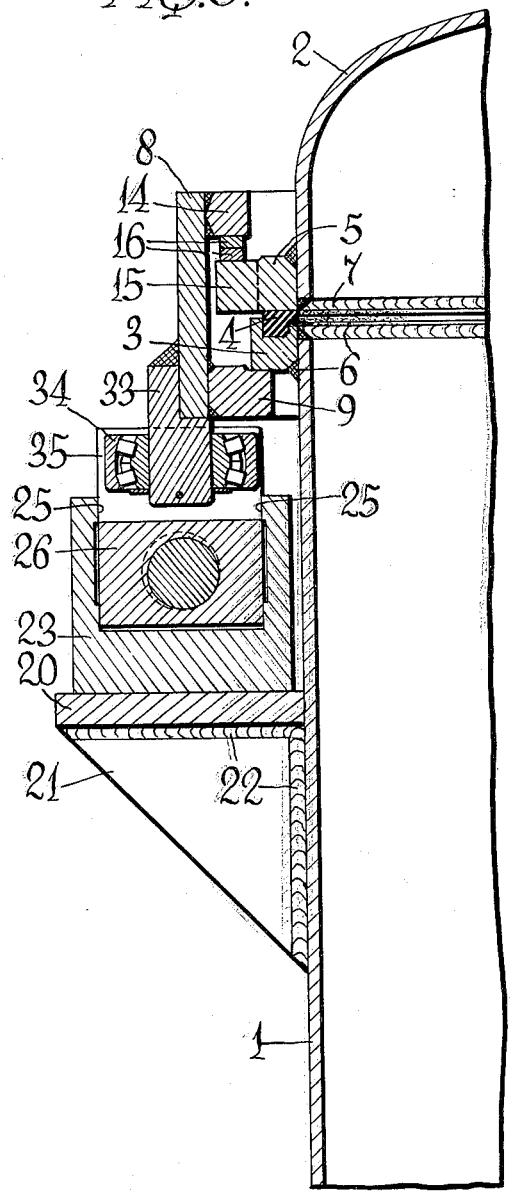
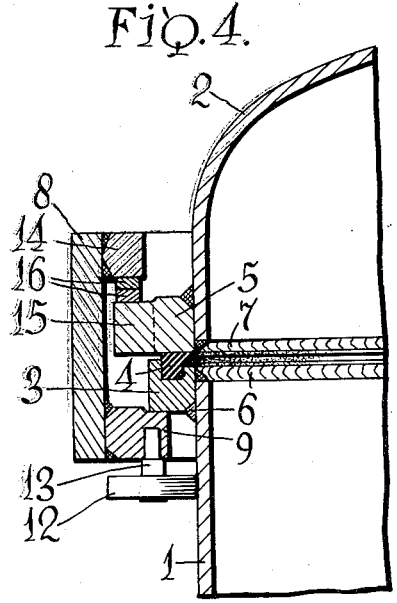
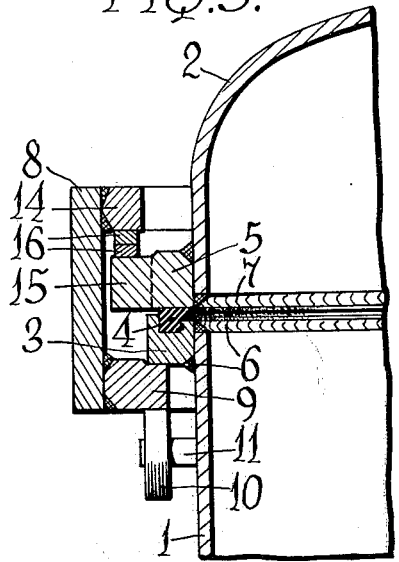
INVENTOR.
Richard G. Lyall,
BY
Bean, Brooks, Buckley & Bean
ATTORNEYS.

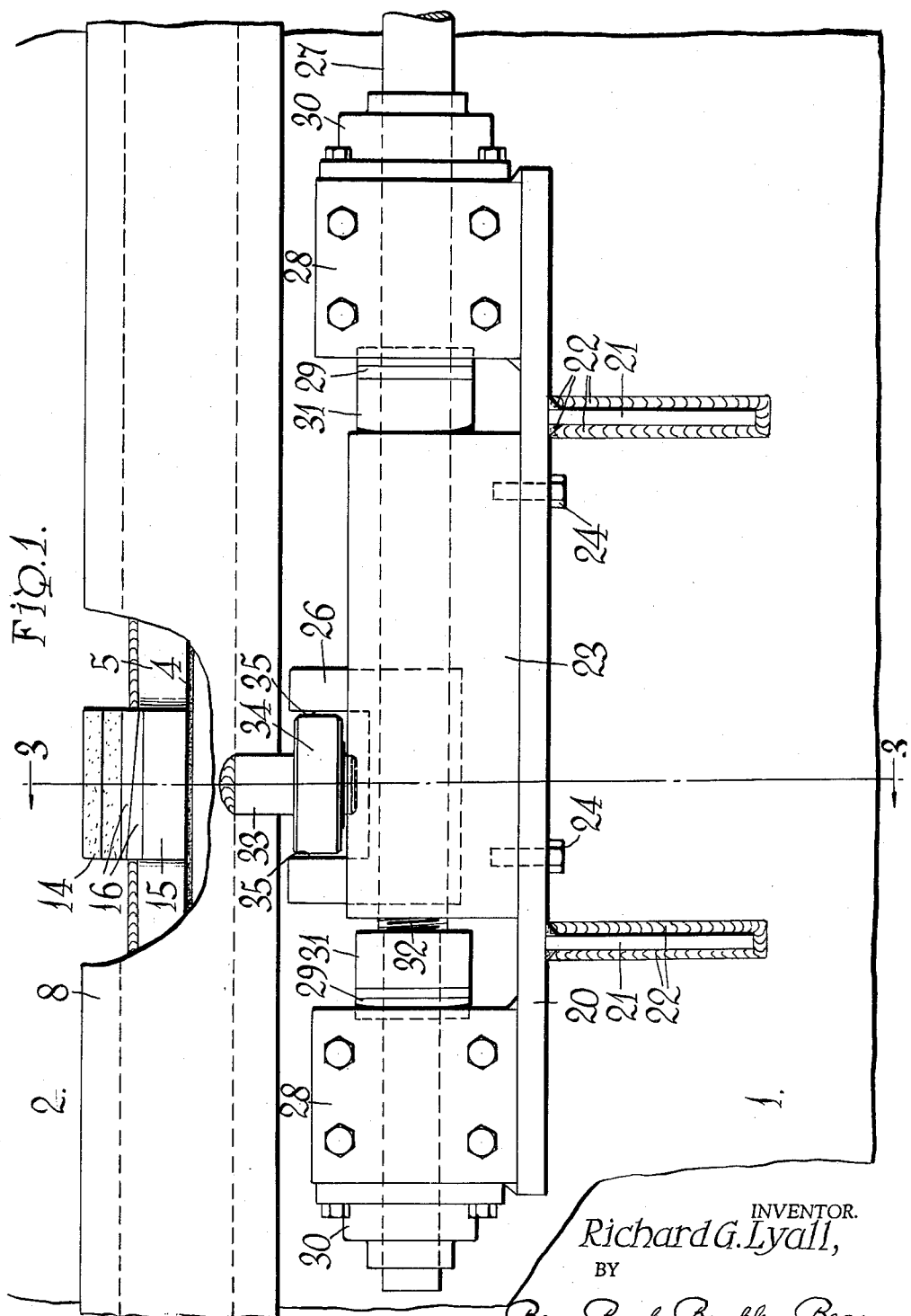

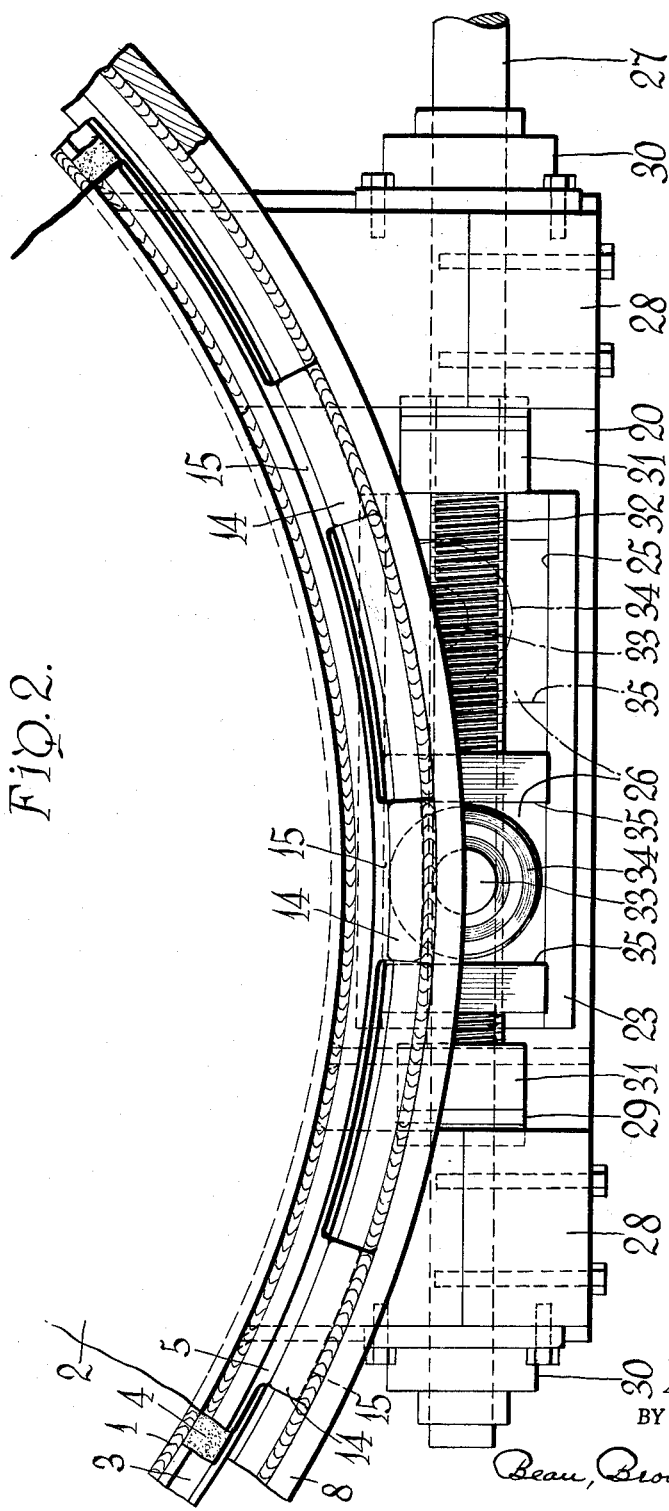

United States Patent Office 3,098,580
Patented July 23, 1963

3,098,580
QUICK OPENING CLOSURE MECHANISM
Richard G. Lyall, Buffalo, N.Y., assignor to Yuba Consolidated Industries, Inc., San Francisco, Calif.
Filed Feb. 21, 1961, Ser. No. 90,877
4 Claims. (Cl. 220—40)

This invention relates generally to the closure art, and more specifically to a quick operating device for selectively locking and releasing a vessel closure member.

While it is by no means limited thereto, my invention is particularly concerned with relatively large, heavy industrial closure members, such as are power operated between open and closed positions, and which are releasably locked in closed position, it being a primary object of my invention to provide a quick operating device for selectively locking and releasing the closure member which is relatively simple and inexpensive in construction, while being highly durable and dependable in operation. It is another particular object of my invention to provide a device of this nature which is capable of being operated from a remote point, enabling its use in situations where it is desired, or necessary, that the vessel not be closely approached by an operator.

A closure member locking and releasing mechanism constructed in accordance with my invention is characterized by the provision of a drive member mounted on the vessel to be closed for substantially rectilinear movement relative to the vessel, generally peripherally thereof, means selectively operable to so move the drive member, a locking ring positioned for rotation about the vessel and adapted when in one position to lock the closure member on the vessel and when in another position to release the closure member for opening movement thereof, and means placing the drive member in driving engagement with the locking ring including roller means translating the rectilinear motion of the drive member into rotation of the locking ring.

The foregoing and other objects, advantages and characterizing features of a closure member operating device constructed in accord with my invention will become clearly apparent from the ensuing detailed description of a presently preferred embodiment thereof, taken in conjunction with the accompanying drawings illustrating such embodiment wherein like reference numerals denote like parts throughout the various views and wherein:

FIG. 1 is a fragmentary, side elevational view of a vessel and closure member therefor incorporating the device of my invention, certain parts being broken away for greater clarity;

FIG. 2 is a top plan view thereof;

FIG. 3 is a fragmentary, transverse sectional view thereof taken about in line 3—3 of FIG. 1; and FIGS. 4 and 5 are fragmentary, transverse sectional views corresponding to that of FIG. 3 but taken at different points around the periphery of the vessel.

Referring now in detail to the embodiment illustrated in the accompanying drawings, the device of my invention is adapted for use in conjunction with a vessel 1 having a closure member 2 adapted to close the same, which closure member can be hinged to the vessel, if desired or otherwise mounted in ways known in the art, and which can be moved between open and closed positions either manually or by a suitable powered mechanism, not illustrated, the details of which comprise no part of my invention. Adjacent its open, upper end vessel 1 is provided with an annular, laterally projecting, external flange 3 carrying a gasket 4 seated therein and projecting thereabove for bearing against the underside of an annular, laterally projecting, external flange 5 carried by the closure member 2, the flanges 3 and 5 being secured to the vessel and closure member, respectively, as by weldments 6 and 7. When the closure member is in its closed position, illustrated in the drawings, flange 5 bears against sealing gasket 4 in sealing relation thereto.

In vessels of this type, it is customarily desired to provide a strong, releasable locking means for holding the closure member in sealing engagement with the vessel, and this can be accomplished by a locking ring 8 adapted to overlap the joint between vessel 1 and closure member 2 and having along its lower edge an internal, lateral, annular flange 9 underlying flange 3 and adapted to ride on rollers 10 carried by shafts 11 projecting generally radially from the outer wall of vessel 1. Locking ring 8 is supported by rollers 10 for rotation about vessel 1 and its closure member 2, and to properly center the locking ring about the vessel 1 there are provided rollers 12 carried by shafts 13 depending from flange 9. Rollers 12 ride on the outer wall of vessel 1, between rollers 10, whereby locking ring 8 is supported and guided for rotation in opposite directions relative to vessel 1 and its closure 2 between limits determined by the rollers 10 and 12.

Ring 8 carries spaced, lateral internal lugs 14 positioned around its upper edge, which lugs are adapted in one rotary position of locking ring 8 to overlie lugs 15 which can conveniently project laterally from the annular flange 5 carried by closure member 2. Lugs 14 and 15 carry on their adjacent surfaces coacting wedges 16 which are adapted, when in the position illustrated in the drawings, to exert a wedging action locking closure member 2 in sealed relation to vessel 1. Flange 9 bears against flange 3 and retains ring 8 on vessel 1 during such wedging action.

The arrangement of lugs 14 and 15 is such that, upon rotation of locking ring 8 to a second rotary position, the lugs 15 carried by closure member 2 are aligned with the spaces between lugs 14 on the locking ring, permitting closure member 2 to be moved from its closed position illustrated in the drawings to an open position, by enabling the pressure of lugs 15 between lugs 14. Such locking rings are known in the art, and do not, per se, comprise a part of this invention.

However, means must be provided for rotating the locking ring between its first and second, or locking and unlocking positions, and the provision of a mechanism eminently suitable for this purpose is accomplished in accord with my invention as follows.

To the outer wall of vessel 1, adjacent its upper end, I provide a support bracket in the form of a plate 20 carried by gusset plates 21 secured to the outer wall of vessel 1, and to the underside of plate 20, as by weldments 22. On the upper surface of plate 20 there is secured a first guide member in the form of a traverse block guide 23, which is conveniently secured to plate 20 by fastening bolts 24. Traverse block guide 23 provides generally parallel guide surfaces 25 between which a traverse block 26 is adapted to move rectilinearly, generally peripherally of vessel 1, the term peripherally being used in its broad sense to define the surface of the vessel which need not be cylindrical but can have other external configurations. Traverse block 26 is conveniently moved in opposite directions relative to its guide 23 by means including a shaft 27 which extends through guide 23, between its guiding surfaces 25, and is journaled on opposite sides of guide 23 in support blocks 28. Blocks 28 are secured to plate 20, as by welding, and carry bearings 29 and flanged cartridges 30 receiving shaft 27, with collars 31 being provided to hold shaft 27 properly positioned. Shaft 27 has a threaded portion 32 engaging traverse block 26, whereby upon rotation of shaft 27 about its axis block 26 is caused to travel along the axis of rotation of shaft 27 in opposite directions, the direction of travel of block 26 depending upon the direction of rotation of shaft 27.

It is necessary to translate the rectilinear motion of block 26 into rotation of locking ring 8, which problem is complicated by the fact that a member fixed to locking ring 8, to move therewith, and engaging the block 26 for movement thereby, will move laterally relative to shaft 27 upon rotation of the locking ring. This relative, crosswise motion is accommodated in the device of my invention by providing locking ring 8 with a depending member comprising a pin 33 carrying at its lower end a roller 34, which roller is confined between parallel guide surfaces 35 on traverse block 26, the surfaces 35 being aligned transversely of the axis of rotation of shaft 27.

Therefore, when ring 8 is in its locking position the traverse block 26 and roller 34 are positioned as illustrated in full lines in FIG. 2, with roller 34 being positioned over, and in alignment with, the axis of rotation of shaft 27. As shaft 27 is rotated about its axis, to in turn rotate locking ring 8 to its unlocking position, traverse block 26 is caused to move rectilinearly to its position illustrated in broken lines in FIG. 2, carrying with it roller 34 which simultaneously moves tranversely of shaft 27 to an offset position relative to the axis thereof, as illustrated in broken lines in FIG. 2. Therefore, the traverse block guide 23 acts as a guide causing rectilinear motion of traverse block 26, and the latter functions as a guide causing rectilinear motion of the roller 34 in a direction transversely of shaft 27. These two rectilinear motions, crosswise of each other, accommodate lateral movement of roller 34, relative to shaft 27, and serve to translate the rectilinear motion of traverse block 26 into rotation of locking ring 8.

It will be noted that this construction is extremely rugged, and at the same time quite simple and relatively inexpensive. In addition, it offers the very significant advantage that shaft 27 can be rotated from a very great distance, enabling use of the device of my invention in installations where it is inconvenient, if not impossible, for the operator to closely approach the vessel itself. Of course, shaft 27 can be provided with means to receive a wrench or other tool, or an operating handle, positioned close to the vessel.

Further it will be observed that roller 34 is substantially alined with the axis of rotation of shaft 27 when the locking ring is in its locking position, and moves to an offset position as the locking ring is rotated to its unlocking position. This arrangement is preferred because considerable force and reaction is encountered as wedges 16 bear against each other upon movement of locking ring 8 into its locking position. This reaction is transmitted to the device of my invention, and is least effective when roller 34 is substantially alined with the axis of rotation of the actuating shaft 27 and not offset therefrom. In this way, strain resulting from locking forces is reduced to a minimum.

Accordingly, it is seen that my invention fully accomplishes its intended objects, providing a quick operating device for locking and releasing a closure member, which can be actuated from a great distance, and while I have illustrated and described herein only one, presently preferred embodiment of my invention, it will be appreciated that my invention, is not necessarily limited to the details thereof. Instead, modifications and variations will occur to those skilled to the art, without departing from the spirit of my invention or the scope of the appended claims.

Having fully disclosed and completely described my invention and its mode of operation, what I claim as new is:

1. In combination with a vessel, a closure member for said vessel, and a locking ring carried by said vessel for rotation relative thereto and to said closure member, said locking ring when in a first rotary position locking said closure member in closed position on said vessel and when in a second rotary position releasing said closure member for opening movement relative to said vessel, an actuating device for rotating said locking ring between said first and second positions comprising, first guide means carried by said vessel, second guide means guided by said first guide means for generally rectilinear movement relative to said vessel generally peripherally thereof, a member carried by said locking ring for rotation therewith, said last-named member engaging said second guide means for movement therewith and simultaneously being guided thereby for movement relative thereto generally transversely of the direction of movement of said second guide means, whereby rectilinear motion of said second guide means is translated into rotary motion of said locking ring, and means selectively operable to so move said second guide means, wherein said second guide means includes generally parallel guide surfaces, and wherein said member carried by said locking ring and engaging said second guide means includes a roller confined between said surfaces.

2. In combination with a vessel, a closure member for said vessel, and a locking ring carried by said vessel for rotation relative thereto and to said closure member, said locking ring when in a first rotary position locking said closure member in closed position on said vessel and when in a second rotary position releasing said closure member for opening movement relative to said vessel, an actuating device for rotating said locking ring between said first and second positions comprising, a support bracket mounted on said vessel, a traverse block guide carried by said support bracket, a traverse block guided by said traverse block guide for substantially rectilinear movement relative to said vessel generally peripherally thereof, means for so moving said traverse block including a shaft in threaded engagement with said traverse block, said shaft being journaled for rotation about an axis extending along the direction of movement of said traverse block, and a member carried by said locking ring for rotation therewith, said member engaging said traverse block for movement thereby and for movement relative thereto generally transversely of said axis of rotation of said shaft, whereby rectilinear motion of said traverse block is translated into rotation of said locking ring, wherein said member carried by said locking ring and engaging said traverse block comprises a roller, and wherein said traverse block has generally parallel guide surfaces between which said roller is loosely confined.

3. The combination set forth in claim 2, wherein said roller is positioned in substantial alinement with said axis of rotation of said shaft when said locking ring is in said first position.

4. In combination with a vessel, a closure member for said vessel, and a locking ring carried by said vessel for rotation relative thereto and to said closure member, said locking ring when in a first rotary position locking said closure member in closed position on said vessel and when in a second rotary position releasing said closure member for opening movement relative to said vessel, an actuating device for rotating said locking ring between said first and second positions comprising, a drive member mounted on said vessel for substantially rectilinear movement relative to said vessel generally peripherally thereof, means selectively operable to so move said drive member, and means placing said drive member in driving engagement with said locking ring, said last-named means including roller means carried by said locking ring and engaging said drive member for translating rectilinear motion of said drive member into rotation of said locking ring.

References Cited in the file of this patent

UNITED STATES PATENTS 2,764,901    Thoresen _____ Oct. 2, 1956

FOREIGN PATENTS 171,712    Switzerland _____ Sept. 15, 1934